(12) United States Patent
Beck et al.

(10) Patent No.: US 8,844,362 B1
(45) Date of Patent: Sep. 30, 2014

(54) SYSTEM, METHOD, AND DEVICE FOR CAPACITIVE PRESSURE SENSING

(71) Applicants: David William Beck, Santa Fe, NM (US); Jacobo Rogelio Archuleta, Sante Fe, NM (US)

(72) Inventors: David William Beck, Santa Fe, NM (US); Jacobo Rogelio Archuleta, Sante Fe, NM (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/969,122

(22) Filed: Aug. 16, 2013

(51) Int. Cl.
*G01L 9/12* (2006.01)

(52) U.S. Cl.
CPC ........................................ *G01L 9/12* (2013.01)
USPC .............................................. 73/718; 73/724

(58) Field of Classification Search
USPC .................................................. 73/700–756
See application file for complete search history.

(56) References Cited

U.S. PATENT DOCUMENTS

| | | | | |
|---|---|---|---|---|
| 3,618,390 A | * | 11/1971 | Johnson | 3/718 |
| 4,434,451 A | * | 2/1984 | Delatorre | 361/283.4 |
| 4,523,474 A | * | 6/1985 | Browne et al. | 73/724 |
| 4,691,574 A | * | 9/1987 | Delatorre | 73/708 |
| 6,122,976 A | * | 9/2000 | Hallberg et al. | 73/756 |

* cited by examiner

*Primary Examiner* — Andre Allen
(74) *Attorney, Agent, or Firm* — King & Spalding LLP

(57) ABSTRACT

A pressure sensor for sensing pressure of a fluid includes a tubular housing that has a first capacitor plate segment and a second capacitor plate segment. Each of the first capacitor plate segment and the second capacitor plate segment includes a respective substantially planar inner surface. The pressure sensor also includes an anvil positioned within the tubular housing. The anvil and the tubular housing function as opposite terminals of a variable capacitor. A first capacitor plate side of the anvil and the first capacitor plate segment face each other and have a first gap therebetween. A second capacitor plate side of the anvil and the second capacitor plate segment face each other and have a second gap therebetween. Capacitance of the variable capacitor changes in response to a first change in a size of the first gap and a second change in a size of the second gap.

18 Claims, 8 Drawing Sheets

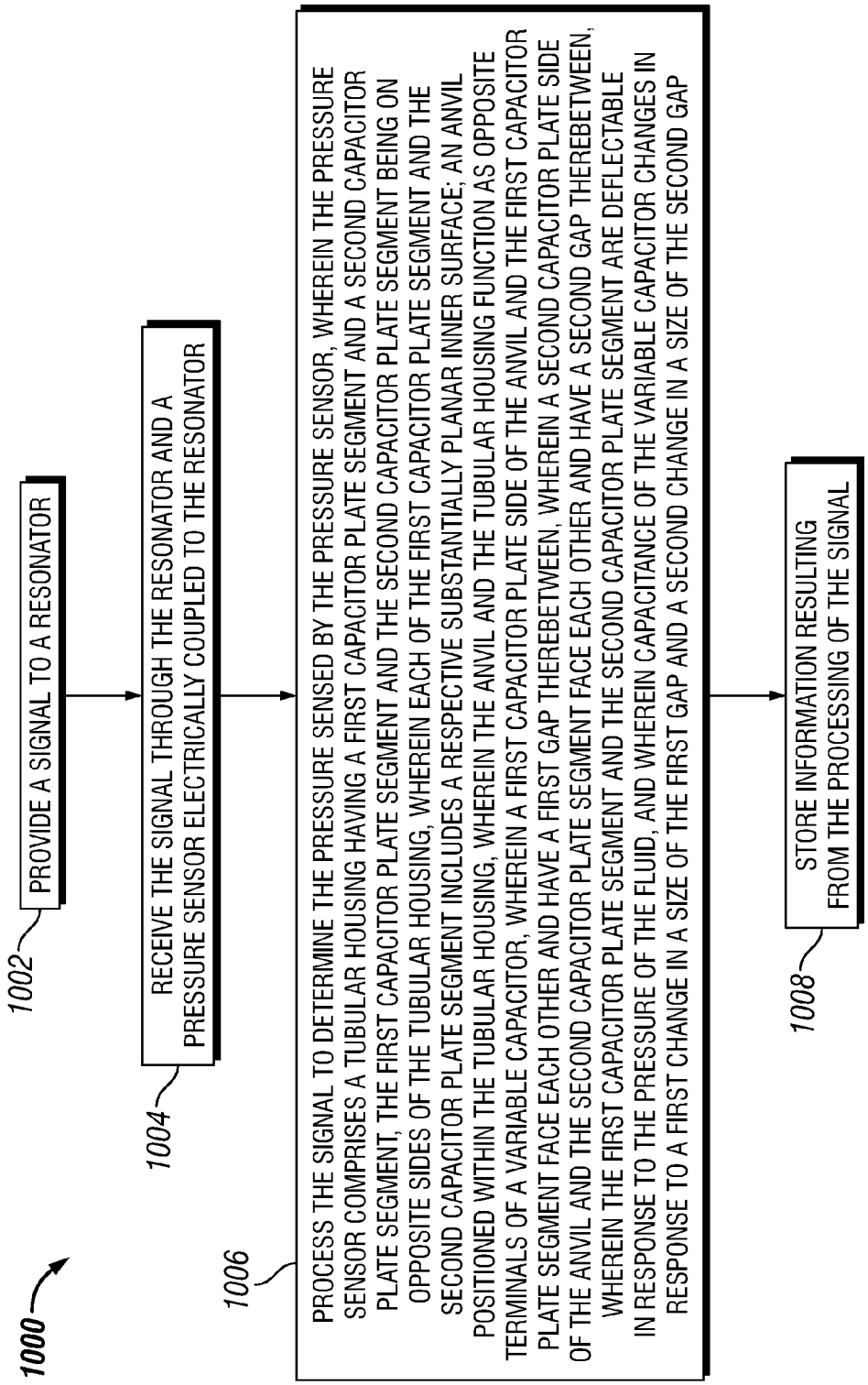

SYSTEM, METHOD, AND DEVICE FOR CAPACITIVE PRESSURE SENSING

TECHNICAL FIELD

The present disclosure relates generally to pressure sensing and more particularly to systems, methods and devices for sensing pressure using a capacitive pressure sensor.

BACKGROUND

Various pressure sensing devices have been used for pressure sensing. Factors such as cost, sensing range, sensitivity to change in pressure, and durability may make some pressure sensors more preferable than others for a particular application. Another factor in the selection of a pressure sensor is usability of a pressure sensor in harsh conditions. For example, some capacitors may not be usable in harsh environments such as areas with very high temperatures. Further, pressures sensors that have many moving parts are generally prone to breakdowns. Thus, in some applications, pressure sensors with few or no moving parts may be preferable.

In some applications, a capacitance based pressure sensor may be preferable. However, such a pressure sensor often has to overcome issues related to unwanted stray capacitance that can negatively affect, for example, the sensitivity of the pressure sensor.

Thus, in some applications, a capacitance based pressure sensor that minimizes effects of stray capacitance and extends durability of the sensor may be desirable.

SUMMARY

The present disclosure relates generally to systems, methods and devices for sensing pressure using a capacitive pressure sensor. In an example embodiment, a pressure sensor for sensing pressure of a fluid includes a tubular housing that has a first capacitor plate segment and a second capacitor plate segment. The first capacitor plate segment and the second capacitor plate segment are on opposite sides of the tubular housing. Each of the first capacitor plate segment and the second capacitor plate segment includes a respective substantially planar inner surface. The pressure sensor also includes an anvil positioned within the tubular housing. The anvil and the tubular housing function as opposite terminals of a variable capacitor. A first capacitor plate side of the anvil and the first capacitor plate segment of the tubular housing face each other and have a first gap therebetween. A second capacitor plate side of the anvil and the second capacitor plate segment of the tubular housing face each other and have a second gap therebetween. The first capacitor plate segment and the second capacitor plate segment are deflectable in response to the pressure of the fluid. Capacitance of the variable capacitor changes in response to a first change in a size of the first gap and a second change in a size of the second gap.

In another example embodiment, a system for measuring a pressure of a fluid comprises a resonator that has a first terminal and a second terminal. The system also includes a signal source configured to provide a signal to the resonator via the first terminal of the resonator. The system further includes a receiver configured to receive the signal from the resonator, and a pressure sensor electrically coupled to the second terminal of the resonator and to the receiver. The receiver is configured to receive the signal via the pressure sensor. The pressure sensor includes a tubular housing that has a first capacitor plate segment and a second capacitor plate segment. The first capacitor plate segment and the second capacitor plate segment are on opposite sides of the tubular housing. Each of the first capacitor plate segment and the second capacitor plate segment includes a respective substantially planar inner surface. The pressure sensor also includes an anvil positioned within the tubular housing. The anvil and the tubular housing function as opposite terminals of a variable capacitor. A first capacitor plate side of the anvil and the first capacitor plate segment of the tubular housing face each other and have a first gap therebetween. A second capacitor plate side of the anvil and the second capacitor plate segment of the tubular housing face each other and have a second gap therebetween. The first capacitor plate segment and the second capacitor plate segment are deflectable in response to the pressure of the fluid. Capacitance of the variable capacitor changes in response to a first change in a size of the first gap and a second change in a size of the second gap.

In another example embodiment, a method for measuring a pressure of a fluid includes providing a signal to a resonator and receiving the signal through the resonator and a pressure sensor electrically coupled to the resonator. The method also includes processing the signal to determine the pressure sensed by the pressure sensor. The pressure sensor includes a tubular housing that has a first capacitor plate segment and a second capacitor plate segment. The first capacitor plate segment and the second capacitor plate segment are on opposite sides of the tubular housing. Each of the first capacitor plate segment and the second capacitor plate segment includes a respective substantially planar inner surface. The pressure sensor also includes an anvil positioned within the tubular housing. The anvil and the tubular housing function as opposite terminals of a variable capacitor. A first capacitor plate side of the anvil and the first capacitor plate segment of the tubular housing face each other and have a first gap therebetween. A second capacitor plate side of the anvil and the second capacitor plate segment of the tubular housing face each other and have a second gap therebetween. The first capacitor plate segment and the second capacitor plate segment are deflectable in response to the pressure of the fluid. Capacitance of the variable capacitor changes in response to a first change in a size of the first gap and a second change in a size of the second gap.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein:

FIG. 10 illustrates a method for measuring a pressure of a fluid in accordance with an example embodiment.

Figure 1:
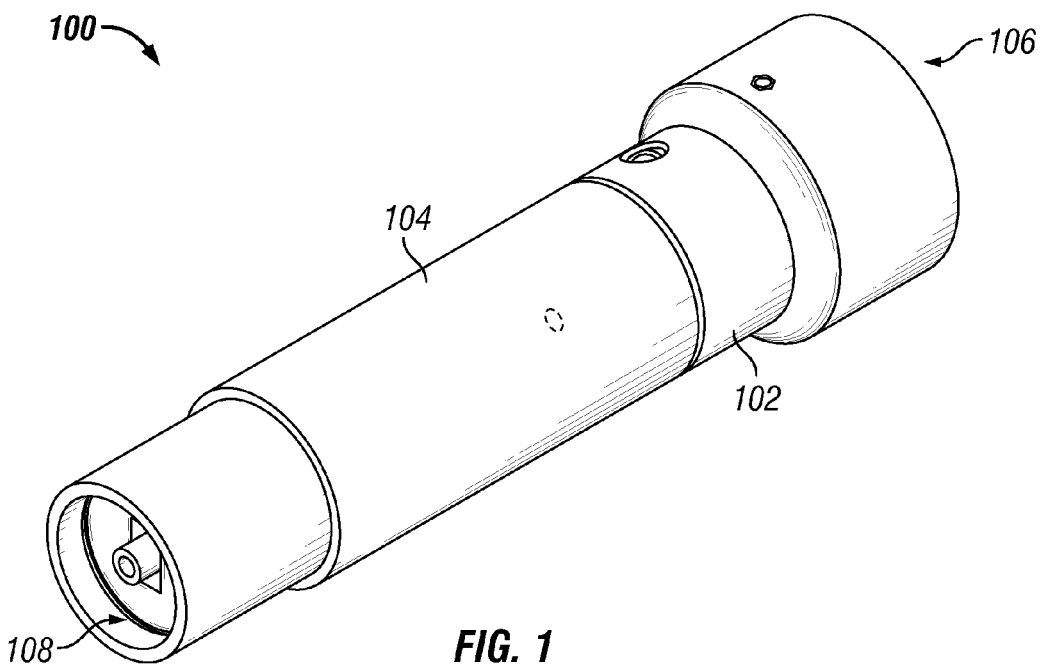
FIG. 1 is a perspective view of a pressure sensor for sensing a pressure of a fluid in accordance with an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Turning now to the drawings, FIG. 1 illustrates a perspective view of a pressure sensor for sensing a pressure of a fluid according to an example embodiment. The pressure sensor 100 operates by associating pressure exerted by a fluid ("outside fluid") that is outside of the pressure sensor 100 to a capacitance of the pressure sensor 100. The pressure sensor 100 is configured to sense a wide range of fluid pressure levels over a wide range of temperature conditions. In some example embodiments, the pressure sensor 100 is configured to operate in an environment having a temperature that ranges from near freezing to over 500 degrees Fahrenheit. In some example embodiments, the pressure sensor may also sense pressure levels ranging from 0 pound per square inch (PSI) to over 5,000 PSI.

In an example embodiment, the pressure sensor 100 includes a tubular housing 102 and a sleeve 104. The sleeve 104 is positioned on the outside of the tubular housing 102 around a capacitor plate portion of the tubular housing 102. The capacitor plate portion of the tubular housing 102 is described below in more detail with respect to FIG. 4.

Figure 2:
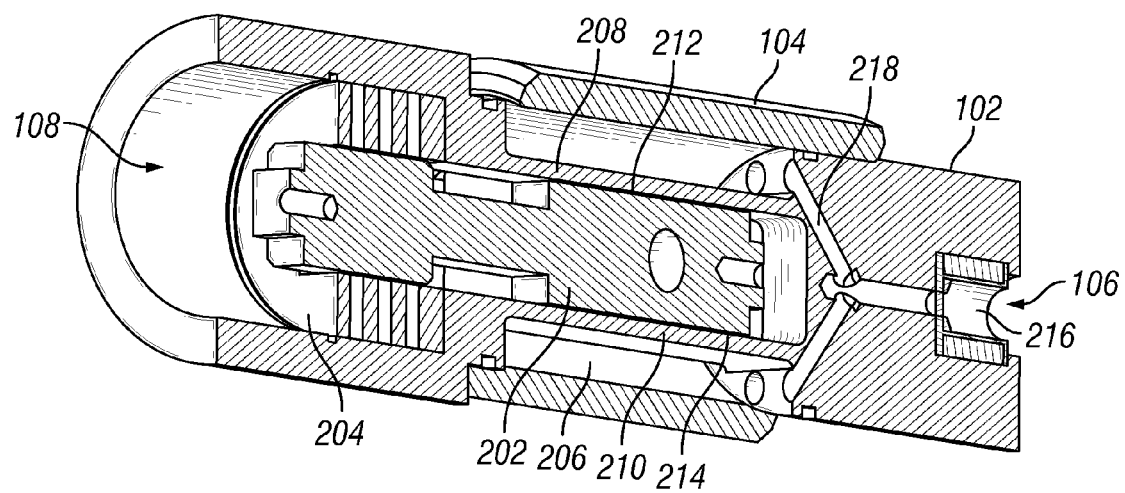
FIG. 2 illustrates a longitudinal cross-section of the pressure sensor of FIG. 1 with a sleeve in accordance with an example embodiment.
Figure 6A:
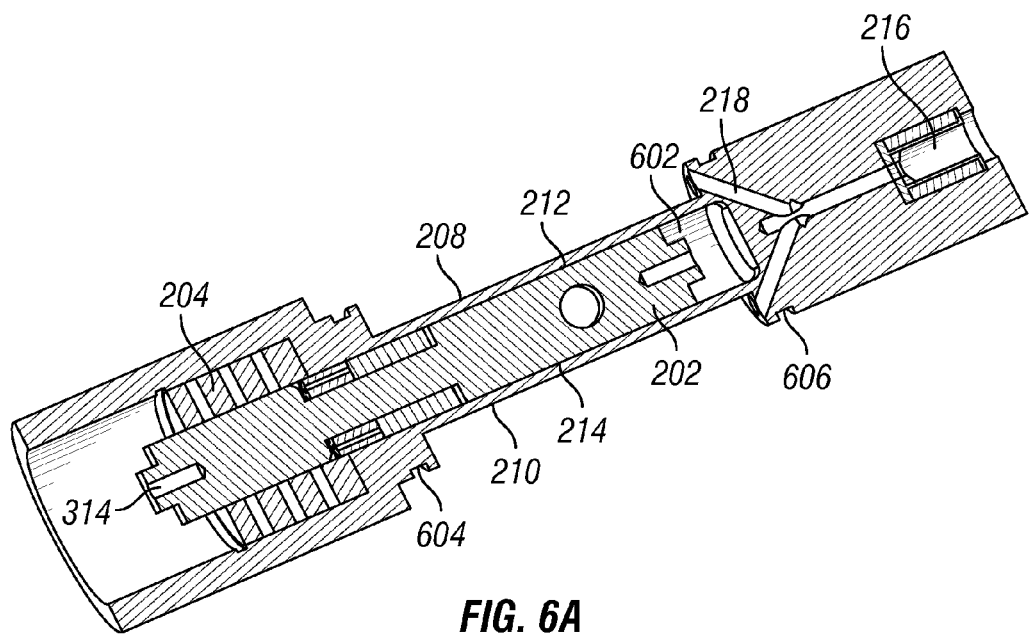
FIGS. 6A and 6B illustrate longitudinal cross-sections of the pressure sensor of FIG. 1 without a sleeve in accordance with an example embodiment.
Figure 6B:
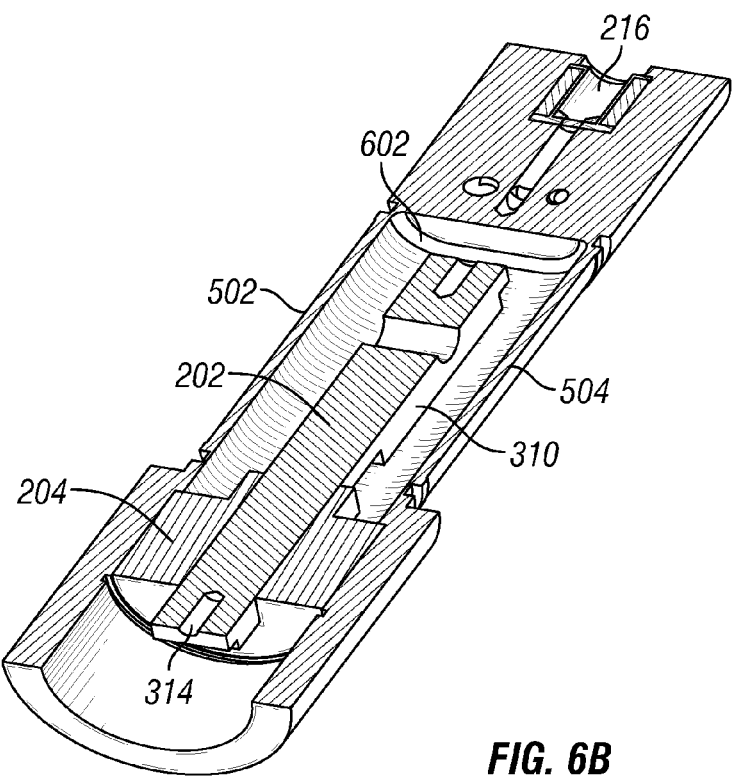

The sleeve 104 encloses the outer circumference of the capacitor plate portion of the tubular housing 102. The tubular housing 102 and an anvil positioned within the tubular housing 102 function as opposite terminals of a variable capacitor having capacitance that varies in response to change in pressure applied by the outside fluid. As described in more detail below with respect to FIG. 2, the anvil, the tubular housing 102, and gaps between the anvil and the tubular housing 102 that are, for example, filled with air define the variable capacitor of the pressure sensor 100. As illustrated in FIGS. 2, 6A and 6B, in some example embodiments, the anvil may be positioned entirely within the tubular housing 102.

In some example embodiments, the tubular housing 102 includes pressure inlet port 106 on one end of the pressure sensor 100, where pressure from the outside fluid is transferred to inside the pressure sensor 100. The pressure inlet port 106 may be designed for exposure to the outside fluid that exerts pressure to be sensed. For example, the pressure inlet port 106 may be exposed to an outside fluid such as oil, gas, or a combination, in a wellbore. The pressure applied by the outside fluid may be transferred to an isolated liquid within the pressure sensor 100 via the pressure inlet port 106 as described below with respect to FIG. 2.

In some example embodiments, the tubular housing 102 also includes an electrical connection interface 108 on another end of the pressure sensor 100 to enable connection of the pressure sensor 100 to electrical components external to the pressure sensor 100. For example, a resonator (e.g., a crystal resonator) that is outside of the pressure sensor 100 may be electrically connected to the anvil through the electrical connection interface 108. In an example embodiment, the electrical connection interface 108 may be covered by an electrical housing containing the electrical components and that is welded to the tubular housing 102.

During operation, the outside fluid may apply pressure on the pressure sensor 100 via the pressure inlet port 106 of the pressure sensor 100. For example, when the pressure inlet port 106 of the pressure sensor 100 is first exposed to the outside fluid, the pressure applied on the pressure sensor 100 via the pressure inlet port 106 may increase. Capacitance of the variable capacitor may correspondingly increase in response to the increase in the pressure. Similarly, if the pressure applied by the outside fluid decreases, the capacitance of the variable capacitor may decrease correspondingly. An increase or decrease in the pressure detected by the pressure sensor 100 results in a corresponding increase or decrease, respectively, of the capacitance of the variable capacitor of the pressure sensor 100.

Referring to FIG. 2, FIG. 2 illustrates a longitudinal cross-section of the pressure sensor of FIG. 1 with a sleeve according to an example embodiment. The pressure sensor 100 includes the tubular housing 102, the sleeve 104 surrounding a capacitor plate portion of the tubular housing 102, and an anvil 202 positioned within the tubular housing 102. The anvil 202 is fixedly attached within the tubular housing 102 by an insulator 204. The insulator 204 maintains the anvil 202 in a substantially fixed position within the tubular housing 102. The anvil 202 is also electrically isolated from the tubular housing 102 by the insulator 204. For example, the anvil 104 may be made from stainless steel, and the tubular housing 102 may be from titanium. To minimize contribution to the overall capacitance of the variable capacitor (described below), the insulator 204 is preferably a low dielectric material. In some example embodiments, the insulator 204 may be made from a high temperature plastic material such as polyetheretherketone (PEEK). In alternative embodiments, the insulator 204 may be made from other materials, such as ceramics, that have higher temperature tolerance than PEEK.

In some example embodiments, the pressure sensor 100 also includes a liquid compartment 206 between the sleeve 104 and the capacitor plate portion of the tubular housing 102 that is surrounded by the sleeve 104. The liquid compartment 206 surrounds the outer circumference of the capacitor plate portion of the tubular housing 102 that is enclosed by the sleeve 104. In some example embodiments, the liquid compartment 206 may contain an isolation liquid that is isolated from the outside fluid. For example, the isolation liquid may be a liquid that has tolerance to high temperatures as high as 500 degrees Fahrenheit.

In some example embodiments, the tubular housing 102 includes the pressure inlet port 106 of the pressure sensor 100. A fluid separator (e.g., a bellows) 216 may be positioned in the tubular housing 102 at the pressure inlet port 106 as illustrated in FIG. 2. The tubular housing 102 also includes one or more hollow tubes 218 that extend from the pressure inlet port 106 to the liquid compartment 206. For example, the one or more hollow tubes 218 may contain the same liquid that is contained within the liquid compartment 206. Pressure applied by the outside fluid at the pressure inlet port 106 of the pressure sensor 100 may be transferred to the isolation liquid in the liquid compartment 206 via the fluid separator 216 and the one or more hollow tubes 218.

As described above with respect to FIG. 1, the tubular housing 102 and the anvil 202 are terminals of a variable capacitor that includes a vacuum space or has air as a dielectric material. To illustrate, the capacitor plate portion of the tubular housing 102 surrounded by the sleeve 104 includes a first capacitor plate segment 208 and a second capacitor plate segment 210. As illustrated in FIG. 2, the first capacitor plate segment 208 and the second capacitor plate segment 210 are on opposite sides of the tubular housing 102.

The first capacitor plate segment 208 faces a first capacitor plate side of the anvil 202. The first capacitor plate side of the anvil 202 is illustrated more clearly in FIG. 3 as the first capacitor plate side 308. A first gap 212 between the first capacitor plate segment 208 and the first capacitor plate side of the anvil 202 may have air or may be a vacuum space. The first capacitor plate segment 208, the first capacitor plate side of the anvil 202, and the first gap 212 (with air or a vacuum space) function as a first capacitor. Further, the size of the first gap 212 (that is, the distance between the first capacitor plate segment 208 and the first capacitor plate side of the anvil 202) may change based on deflection of the first capacitor plate segment 208 of the tubular housing 102. For example, the first capacitor plate segment 208 may be deflected in response to a pressure applied to it by the isolation liquid contained in the liquid compartment 206. In turn, the capacitance of the first capacitor formed between the first capacitor plate segment 208 and the first capacitor plate side of the anvil 202 may change in response to a change in the size of the first gap 212. To illustrate, as the size of the first gap 212 decreases, the capacitance of the first capacitor increases, and as the size of the gap 212 increases, the capacitance of the first capacitor decreases.

Similarly, the second capacitor plate segment 210 faces a second capacitor plate side of the anvil 202. A second gap 214 between the second capacitor plate segment 210 and the second capacitor plate side of the anvil 202 may have air or may be a vacuum space. The second capacitor plate segment 210, the second capacitor plate side of the anvil 202, and the second gap 214 (with air or a vacuum space) function as a second capacitor. Further, the size of the second gap (that is, the distance between the second capacitor plate segment 210 and the second capacitor plate side of the anvil 202) may change based on deflection of the second capacitor plate segment 210 of the tubular housing 102. For example, the second capacitor plate segment 210 may be deflected in response to a pressure applied to it by the isolation liquid contained in the liquid compartment 206. In turn, the capacitance of the second capacitor formed between the second capacitor plate segment 210 and the second capacitor plate side of the anvil 202 may change in response to a change in the size of the second gap 214. To illustrate, as the size of the second gap 214 decreases, the capacitance of the second capacitor increases, and as the size of the second gap 214 increases, the capacitance of the second capacitor decreases.

The combination of the first capacitor (that has the first capacitor plate segment 208 and the first capacitor plate side of the anvil 202 as opposite plates with the first gap 212 therebetween) and the second capacitor (that has the second capacitor plate segment 210 and the second capacitor plate side of the anvil 202 as opposite plates with the second gap 214 therebetween) results in a variable capacitor that has the tubular housing 102 and the anvil 202 as terminals. In some example embodiments, the anvil 202 is used as a positive terminal of the variable capacitor, and the tubular housing 102 is used as a negative terminal of the variable capacitor.

As described above, the pressure applied on the first capacitor plate segment 208 and the second capacitor plate segment 210 by the isolation fluid is based on the pressure transferred to the isolation liquid from the outside fluid via the fluid separator 216. Thus, the first capacitor plate segment 208 and the second capacitor plate segment 210 are deflected in response to the pressure applied by the outside fluid. The change in the size of the first gap 212 and the change in the size of the second gap 214 resulting from the deflections of the first capacitor plate segment 208 and the second capacitor plate segment 210, respectively, result in a corresponding change in the capacitance of the variable capacitor. Because the amounts of deflection of the first capacitor plate segment 208 and the second capacitor plate segment 210 are dependent on the amount of pressure applied by the outside fluid, a capacitance value of the variable capacitor may correspond to the amount of pressure applied by the outside fluid. Thus, the capacitance of the variable capacitor can be used to determine the amount of pressure applied by the outside fluid. Accordingly, the pressure sensor 100 functions as a variable capacitor with a capacitance that indicates the amount of pressure of the outside fluid sensed by the pressure sensor 100.

As described above with respect to FIG. 1, the electrical connection interface 108 enables connection of the pressure sensor 100 to electrical components external to the pressure sensor 100. In particular, the anvil 202 may be connected to an electrical component such as a crystal resonator via the electrical connection interface 108.

During operation, the outside fluid may apply pressure on the pressure sensor 100 via the pressure inlet port 106 of the pressure sensor 100. For example, when pressure applied by the outside fluid at the pressure inlet port 106 increases, the increase in the pressure of the outside fluid results in a corresponding increase in the pressure of the isolation liquid contained in the liquid compartment 206. In turn, the capacitance of the variable capacitor may increase in response to the increase in the pressure applied by the isolation liquid. To illustrate, the increase in the pressure applied by the isolation liquid on the first capacitor plate segment 208 and on the second capacitor plate segment 210 may result in reduction of the sizes of the first gap 212 and the second gap 214, respectively. In turn, the reduction in the sizes of the first gap 212 and the second gap 214 may result in a corresponding increase in the capacitance of the variable capacitor. Similarly, if the pressure applied by the outside fluid decreases, the capacitance of the variable capacitor may decrease correspondingly due to the increase in the sizes of the first gap 212 and the second gap 214.

Relative to an initial capacitance of the variable capacitor that may, for example, correspond to a reference amount of pressure applied to the pressure inlet port 106, a capacitance of the variable capacitor resulting from an increase or a decrease in the pressure of the outside fluid may correspond to the amount of pressure of the outside fluid. Thus, the pressure sensor 100 senses the pressure applied by associating it with capacitance of the variable capacitor, which has the tubular housing 102 and the anvil 202 as opposite terminals as described above.

The pressure sensor 100 senses pressure of the outside fluid with minimal moving parts, which results in durability of the pressure sensor 100. Further, by placing anvil, which may serve as the positive terminal of the variable capacitor of the pressure sensor 100, within the tubular housing 102, stray capacitance that generally limits use of capacitive pressure sensors is significantly reduced.

Figure 3:
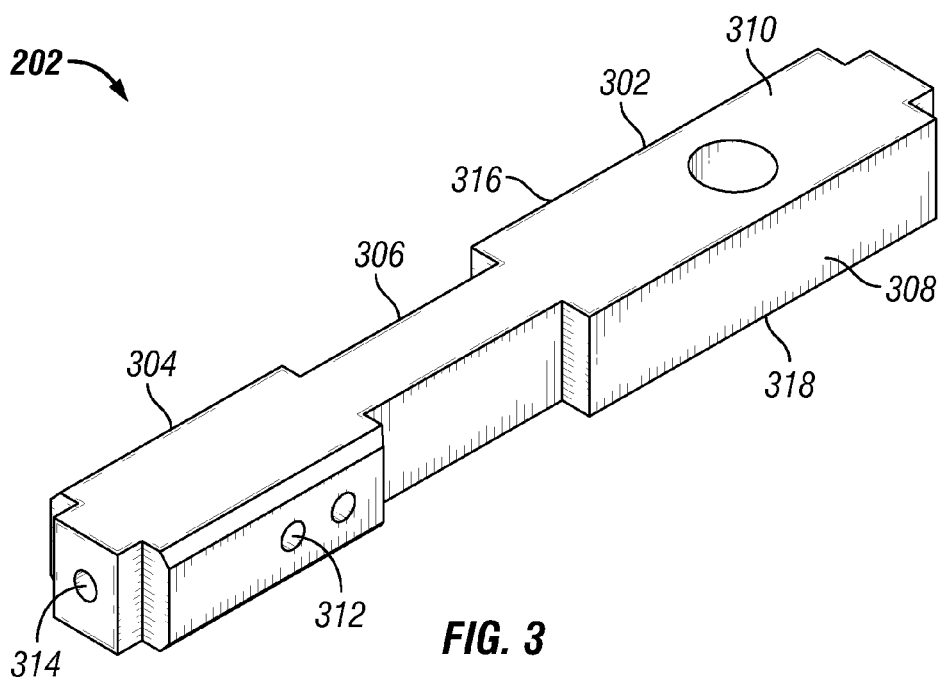
FIG. 3 is a perspective view of an anvil of the pressure sensor of FIG. 1 in accordance with an example embodiment.

FIG. 3 is a perspective view of the anvil 202 of the pressure sensor 100 of FIG. 2 in accordance with an example embodiment. Referring to FIG. 3, in an example embodiment, the anvil 202 includes a capacitor plate segment 302, a coupling segment 304, and a narrow segment 306 between the capacitor plate segment 302 and the coupling segment 304. The anvil 202 may be made from an electrically conductive material, such as copper, stainless steel, inconel, invar, brass, other materials, or a combination thereof. For example, the anvil 202 may be made from inconel for high temperature applications and from brass for low temperature applications. In some example embodiments, the anvil 202 may have a length of approximately 3.2 inches and a height of approximately 0.35 inches in the orientation shown in FIG. 3. In an example embodiment, the width of the capacitor plate segment 302 may be 0.26 inches.

The anvil 202 also includes one or more slots 312 in the coupling segment 304 of the anvil 202. The one or more slots 312 may be used to fixedly attach the anvil 202 within the tubular housing 102 of FIGS. 1 and 2. For example, the one or more slots 312 may be used to attach the anvil 202 to the insulator 204 of FIG. 2. To illustrate, the one or more slots may be threaded and may receive a screw through the insulator 204. In some example embodiments, the one or more slots 312 may extend through the entire width of the anvil 202.

The anvil 202 also includes an electrical connection slot 314 in the coupling segment 304 of the anvil 202. For example, the electrical connection slot 314 may be used to couple the anvil 202 to an electrical component, such as a resonator (e.g., a crystal resonator). In some example embodiments, the electrical connection slot 314 may be threaded. In some alternative embodiments, the anvil 202 may include a different means for connection to electrical connection slot 314.

The capacitor plate segment 302 includes a first capacitor plate side 308 and a second capacitor plate side 316 (not visible in FIG. 3), which are opposite sides of the capacitor plate segment 302. The capacitor plate segment 302 further includes a first idle side 310 and a second idle side 318 (not visible in FIG. 3), which are also opposite sides of the capacitor plate segment 302. The first capacitor plate side 308 corresponds to the first capacitor plate side of the anvil 202 described above with respect to FIG. 2. The first capacitor plate side 308 faces the first capacitor plate segment 208 of the tubular housing 102. The first capacitor plate side 308 and the first capacitor plate segment 208 form the plates of the first capacitor that includes the first gap 212 (with air or a vacuum space) therebetween.

The second capacitor plate side 316 corresponds to the second capacitor plate side described above with respect to FIG. 2. The second capacitor plate side 316 faces the second capacitor plate segment 210 of the tubular housing 102. The second capacitor plate side 316 and the second capacitor plate segment 210 form the plates of the second capacitor that includes the second gap 214 (with air or a vacuum space) therebetween. As described above with respect to FIG. 2, the combination of the two capacitors forms the variable capacitor that has the tubular housing 102 and the anvil 202 as opposite terminals.

Figure 5:
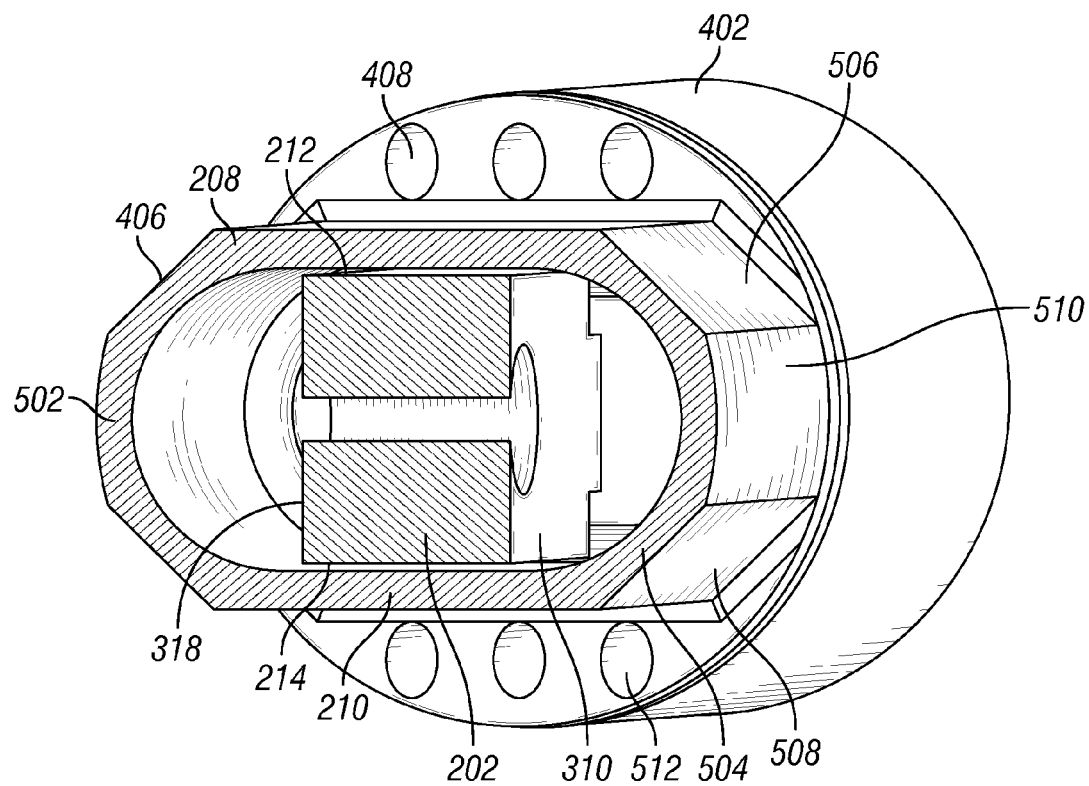
FIG. 5 illustrates a lateral cross-section of the pressure sensor of FIG. 1 without a sleeve in accordance with an example embodiment.

As described in more detail with respect to FIG. 5, the anvil 202 may be positioned within the tubular housing 102 in such a manner that the first idle side 310 and the second idle side 318 facing respective surfaces of the tubular housing 102 have negligible or no contribution to the capacitance of the variable capacitor. In some alternative embodiments, the anvil 202 may have other shapes and surfaces without departing from the scope of this disclosure. For example, in other embodiments, the anvil may be arranged with only one capacitor plate side with the remaining sides of the anvil being idle. Likewise, yet other embodiments of the anvil may have more than two capacitor plate sides. Further, although FIG. 3 shows an opening in the first idle side 310 of the anvil 202, in some alternative embodiments, the first idle side 310 may not include the opening or may include more than one opening.

Figure 4:
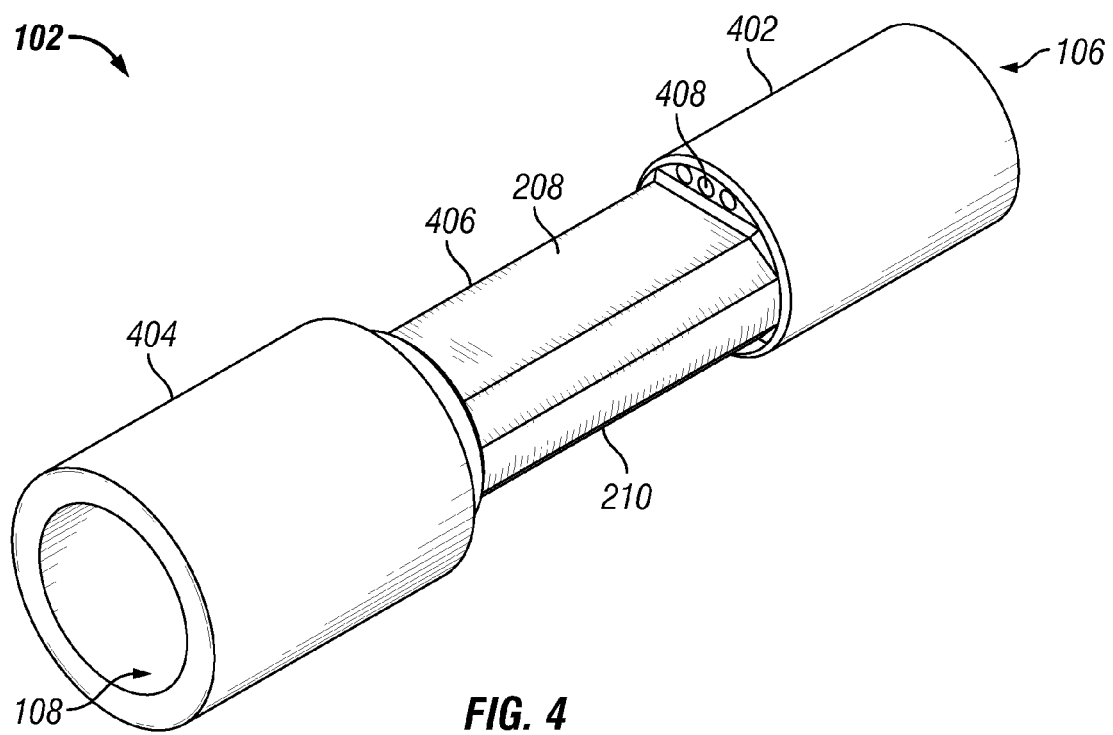
FIG. 4 is a perspective view of a tubular housing of the pressure sensor of FIG. 1 in accordance with an example embodiment.

FIG. 4 is a perspective view of the tubular housing 102 of the pressure sensor 100 of FIGS. 1 and 2 in accordance with an example embodiment. The tubular housing 102 may be electrically conductive. For example, the tubular housing 102 may be made from an electrically conductive material such as titanium. The tubular housing 102 includes a pressure interface portion 402, an electrical interface portion 404, and a capacitor plate portion 406. The pressure interface portion 402 includes the pressure inlet port 106 that may be exposed to the outside fluid for sensing pressure of the outside fluid. The pressure interface portion 402 also includes one or more pressure inlets 408 that interface the one or more hollow tubes 218 of FIG. 2 with the liquid compartment 206 surrounding the capacitor plate portion 406 as illustrated in FIG. 2. In some example embodiments, the pressure interface portion 402 has a substantially cylindrical shape.

In some example embodiments, the electrical interface portion 404 includes the electrical connection interface 108 of the pressure sensor 100. For example, the coupling segment 304 of the anvil 202 illustrated in FIG. 3 may be positioned within the electrical interface portion 404. As illustrated in FIG. 2, the insulator 204 may electrically isolate the anvil 202 from the electrical interface portion 404 of the tubular housing 102. The electrical interface portion 404 allows electrical connection of the anvil 202 with electrical components, such as a crystal resonator, via the electrical connection interface 108. In some example embodiments, the electrical interface portion 404 has a substantially cylindrical shape.

In some example embodiments, the capacitor plate portion 406 includes the first capacitor plate segment 208 and the second capacitor plate segment 210. As illustrated in FIGS. 2 and 4, the first capacitor plate segment 208 and the second capacitor plate segment 210 are on opposite sides of the tubular housing 102. Each of the first capacitor plate segment 208 and the second capacitor plate segment 210 may be a substantially planar surface.

As described above with respect to FIG. 2, the first capacitor plate segment 208 and the second capacitor plate segment 210 are physically deflectable in response to pressure applied to them, for example, by an isolation fluid in the liquid compartment 206 shown in FIG. 2. The amount of deflection of the first capacitor plate segment 208 and the second capacitor plate segment 210 may depend on the amount of pressure applied on them. As described above with respect to FIG. 2, the amount of deflection of the first capacitor plate segment 208 and the second capacitor plate segment 210 affects the first gap 212 and the second gap 214 shown in FIG. 2 and may result in change in capacitance of the variable capacitor. As described above, the variable capacitor has the tubular housing 102 and the anvil 202 as terminals and is based on capacitance of capacitors formed by portions of the tubular housing 102 and the anvil 202.

FIG. 5 illustrates a lateral cross-section of the tubular housing 102 of FIG. 4 in accordance with an example embodiment. The pressure interface portion 402 includes the one or more pressure inlets 408 above the capacitor plate portion 406. The pressure interface portion 402 also includes one or more pressure inlets 512 below the capacitor plate portion 406. Although three pressure inlets 408 and three pressure inlets 512 are shown in FIG. 5, in alternative embodiments, the pressure interface portion 402 may include fewer or more than three pressure inlets above and below the capacitor plate portion 406.

In some example embodiments, the capacitor plate portion 406 includes the first capacitor plate segment 208, the second capacitor plate segment 210, a first side segment 502, and a second side segment 504. The first side segment 502 extends between the first capacitor plate segment 208 and the second capacitor plate segment 210 on a first side of the tubular housing 102. Similarly, the second side segment 504 extends between the first capacitor plate segment 208 and the second capacitor plate segment 210 on a second side of the tubular housing 102 opposite the first side. Each of the first side segment 502 and the second side segment 504 has a corresponding curved inner surface that curves away from the anvil 202. As illustrated in FIG. 5, the curved inner surface of the first side segment 502 curves away from the first idle side 310 of the anvil 202. Similarly, the curved inner surface of the second side segment 504 curves away from the second idle side 318 of the anvil 202.

Each of the first side segment 502 and the second side segment 504 includes a first substantially planar outer surface, a second substantially planar outer surface, and a third curved outer surface between the first substantially planar outer surface and the second substantially planar outer surface. To illustrate, the second side segment 504 includes a first substantially planar outer surface 506, a second substantially planar outer surface 508, and a third curved outer surface 510 between the first outer surface 506 and the second outer surface 508.

As illustrated in FIG. 5, the first capacitor plate segment 208 includes a substantially planar inner surface and a respective substantially planar outer surface. Similarly, the second capacitor plate segment 210 includes a substantially planar inner surface and a respective substantially planar outer surface. As illustrated, the first gap 212 is between the first capacitor plate segment 208 and the first capacitor plate side 308 of the anvil 202. Similarly, the second gap 214 is between the second capacitor plate segment 210 and the second capacitor plate side 316.

In some example embodiments, the capacitor plate portion 406 has a dimension of approximately 0.63 inches between the outer surface of the first capacitor plate segment 208 and the outer surface of the second capacitor plate segment 210 when no pressure is applied on the first capacitor plate segment 208 and the second capacitor plate segment 210 by an isolation liquid in the liquid compartment 206. The capacitor plate portion 406 may also have a dimension of approximately 0.50 inches between the inner surface of the first capacitor plate segment 208 and the inner surface of the second capacitor plate segment 210 when no pressure is applied on the first capacitor plate segment 208 and the second capacitor plate segment 210 by an isolation liquid contained in the liquid compartment 206. The capacitor plate portion 406 may also have a dimension of approximately 0.93 inches between the center of the curved inner surface of the first side segment 502 and the center of the curved surface of the second side segment 504.

In some example embodiments, the gap between the curved inner surface of the first side segment 502 and the first idle side 310 of the anvil 202 is sized to minimize their contribution to the overall capacitance of the variable capacitor, which, as described above, has the tubular housing 102 and the anvil 202 as terminals. The gap between the curved inner surface of the first side segment 502 and the first idle side 310 of the anvil 202 is also sized to minimize their contribution to the overall capacitance of the variable capacitor even when a portion of the first side segment 502 is deflected due to pressure applied on it by the isolation fluid. Similarly, the gap between the curved inner surface of the second side segment 504 and the second idle side 318 of the anvil 202 is also sized to minimize both their contribution to the overall capacitance of the variable capacitor and their contribution to a change in the overall capacitance of the variable capacitor.

FIGS. 6A and 6B illustrate longitudinal cross-sections of the pressure sensor 100 of FIG. 2 without the sleeve 104 in accordance with an example embodiment. As illustrated, the tubular housing 102 includes an inner compartment 602. For example, the inner compartment 602 may contain air. Alternatively, the inner compartment 602 may be a vacuum space. Accordingly, gaps, such as the first gap 212 and the second gap 214 shown in FIGS. 2 and 5, may be filled with air or may be vacuum spaces. As those skilled in the art understand, the overall capacitance of the variable capacitor described above with respect to FIGS. 2 and 5 is fractionally higher when the inner compartment 602 is a vacuum space compared to when the inner compartment 602 is filled with air.

In some example embodiments, the tubular housing 102 includes grooves 604 and 606. The grooves 604 and 606 may be used for mounting "O" rings which seal the sleeve 104 to the tubular housing 102 as illustrated in FIGS. 1 and 2. Alternatively, in another embodiment, the "O" ring grooves 604 and 606 may be omitted in the tubular housing 102 if they are utilized in the sleeve 104 instead.

Figure 7:
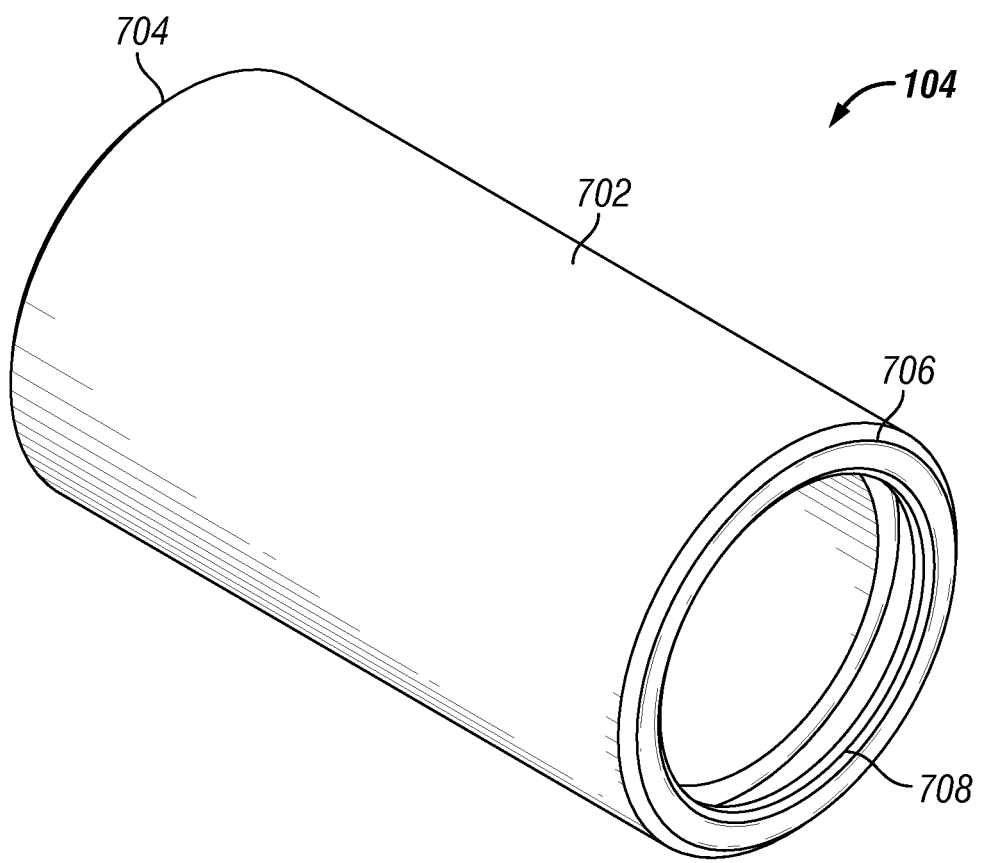
FIG. 7 illustrates a perspective view of a sleeve of the pressure sensor of FIGS. 1 and 2 in accordance with an example embodiment.

FIG. 7 illustrates a perspective view of the sleeve 104 of the pressure sensor of FIGS. 1 and 2 in accordance with an example embodiment. The sleeve 104 includes a body portion 702, a first end portion 704, and a second end portion 706. For example, the sleeve 104 may be made from stainless steel.

In some example embodiments, the body portion 702 may have a cylindrical shape. Each of the first end portion 704 and the second end portion 706 at the respective ends of the body portion 702 may include a groove 708 that is configured to fit an "O" ring. The sleeve 104 may also be welded in place. In some alternative embodiments, the sleeve 104 may not have the grooves 708. Further, the sleeve 104 may be attached to the tubular housing 102 using means other than welding.

Figure 8:
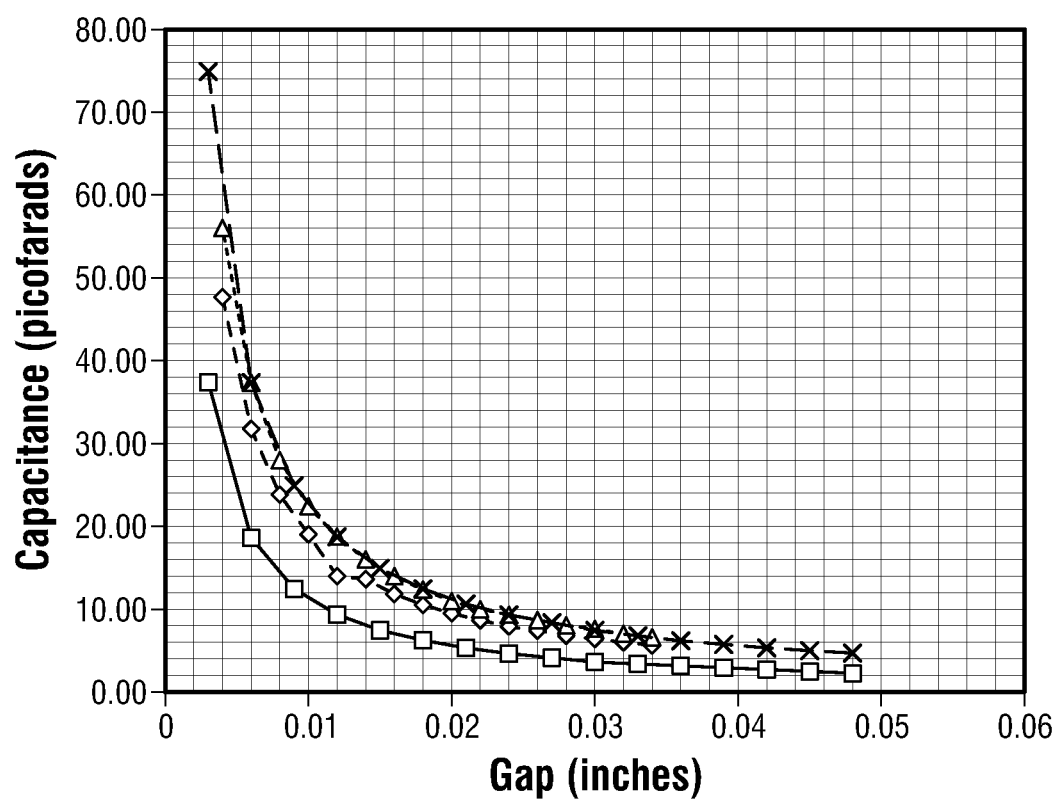
FIG. 8 illustrates relationships between capacitance value and size of gap between capacitor plates for various capacitor plate area sizes in accordance with an example embodiment.

FIG. 8 illustrates relationships between capacitance value of a variable capacitor and the size of the gap between plates of the variable capacitor in accordance with an example embodiment. The different curves shown in FIG. 8 correspond to different plate area sizes of the capacitor plates. The horizontal axis corresponds to the gap between the plates measured in inches. The vertical axis corresponds to capacitance values of the variable capacitor. As illustrated in FIG. 8, as the size of the gap between the plates increases, the capacitance of the capacitor decreases. Conversely, as the size of the gap decreases, the capacitance of the capacitor increases. While the different curves of FIG. 8 illustrate that the capacitance value varies based on the area of the plates, the inverse nature of the relationship between the gap size and the capacitance of the variable capacitor holds in all the illustrated curves.

Figure 9:
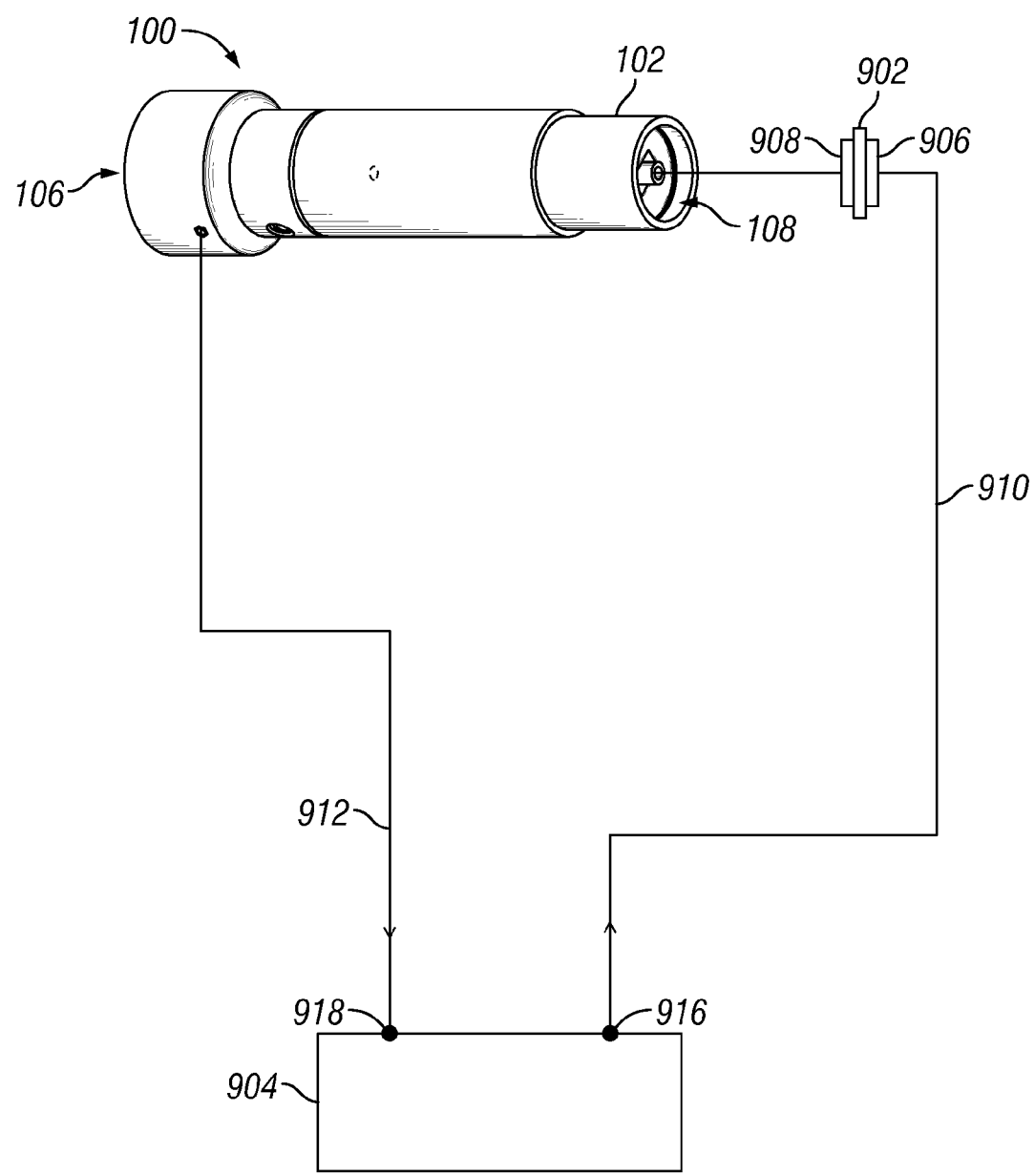
FIG. 9 illustrates a system for measuring a pressure of a fluid using the pressure sensor of FIG. 1 in accordance with an example embodiment.

FIG. 9 illustrates a system 900 for measuring a pressure exerted by a fluid according to an example embodiment. The system 900 includes a crystal resonator 902, a network analyzer 904, and the pressure sensor 100. In an example embodiment, the network analyzer 904 includes a signal source that generates a signal and a receiver that receives a signal. An output port 916 of the network analyzer 904 is electrically coupled to a terminal 906 of the crystal resonator 902 and is configured to provide a signal to the crystal resonator 902 via an electrical connection 910 coupled to the terminal 906. For example, the signal provided to the crystal resonator 902 may have a frequency that varies in value within a range that may include a natural resonance frequency of the crystal resonator 902.

In an example embodiment, an input port 918 of the network analyzer 904 is coupled to the tubular housing 102 of the pressure sensor 100 by an electrical connection 912. For example, the electrical connection 912 may be an electrically conductive wire that is attached to the tubular housing 102.

In an example embodiment, the electrical connection 912 includes a wellhead of an oil or gas well. For example, the pressure sensor 100 may be placed in an oil or gas well, and the wellhead may be electrically coupled to the tubular housing 102 of the pressure sensor 100 and to the input port 918 of the network analyzer. In some example embodiments, the electrical connection 912 may also include a downhole tool housing that is electrically conductive. Similarly, the electrical connection 910 between the network analyzer 904 and the terminal 906 of the crystal resonator 902 may include a well tubing.

In an example embodiment, a frequency of the signal generated by the network analyzer 904 corresponds to the pressure sensed by the pressure sensor 100. To illustrate, the crystal resonator 902 is in series with the variable capacitor that has the tubular housing 102 and the anvil 202 as terminals, as described above. In particular, a terminal 908 of the crystal resonator 902 is electrically coupled with the anvil 202 of the pressure sensor 100. As those skilled in the art would understand, the capacitance of the variable capacitor may pull the crystal resonator 902 away from its natural resonance frequency such that the crystal resonator 902 resonates at a frequency ("operating frequency") that is different from its natural resonance frequency. When the fluid pressure being sensed by the pressure sensor 100 changes, the capacitance of the variable capacitor changes correspondingly as described above. In turn, the operating frequency of the crystal resonator 902 changes correspondingly. Thus, because the capacitance of the variable capacitor corresponds to the pressure sensed by the pressure sensor 100, and because the operating frequency of the crystal resonator 902 corresponds to the capacitance of the variable capacitor, the operating frequency of the crystal resonator 902 corresponds to and is indicative of the pressure sensed by the pressure sensor 100.

The operating frequency of the crystal resonator 902 may be determined by sweeping through various frequencies (i.e., varying the frequency) of the signal provided by the network analyzer 902 and processing the signal when it is received by the network analyzer 902 through the crystal resonator 902 and the pressure sensor 100. To illustrate, the crystal resonator 902 has low impedance when its operating frequency and the frequency of the signal from the network analyzer 904 match, and it has high impedance when the frequencies do not match. Thus, the signal, when received at the network analyzer 904 through the crystal resonator 902, may have one or more parameters (e.g., voltage level, power, etc.) that are indicative of whether the signal's frequency and the operating frequency of the crystal resonator 902 match. Accordingly, the operating frequency of the crystal resonator 902 may be determined by processing the signal, after the signal is received by the network analyzer 904, to determine one or more parameters, such as voltage level, power, and/or frequency of the signal. By determining the operating frequency of the crystal resonator 902, which is indicative of the pressure sensed by the pressure sensor 100, the pressure sensed by the pressure sensor 100 may be determined.

In an example embodiment, the network analyzer 904 can process the signal received through the crystal resonator 902 and the pressure sensor 100 to determine one or more parameters and to further determine the pressure sensed by the pressure sensor 100 based on the one or more parameters. Alternatively, the network analyzer 904 may determine the one or more parameters of the signal and pass the parameter(s) and/or other information to another device to determine the pressure of a fluid sensed by the pressure sensor 100. Those of skill in the art will appreciate that a conventional computing device comprising one or more processors and one or more memories may be included in or operate with the network analyzer 904. Network analyzer 904 may also include communications modules for wired or wireless communications with other local or remote computing devices.

Although FIG. 9 illustrates the crystal resonator 902, in alternative embodiments, another resonator, such as an inductor-capacitor (LC) based resonator or an oscillator, may be used in the system 900 without departing from the scope of this disclosure. In alternative embodiments, instead of the network analyzer 904, the signal source and the receiver may be separate units. Further, in some embodiments, the connection 912 may be at an electrical ground potential and may be coupled to an electrical ground. Further, in some embodiments, a pressure sensing device may include the pressure sensor 100 and a resonator, such as the crystal resonator 902.

FIG. 10 illustrates a method 1000 for measuring a pressure exerted by a fluid according to an example embodiment. The method 1000 includes providing a signal to a resonator, at 1002. For example, the network analyzer 904 of FIG. 9 provides a signal to the crystal 902. The method 1000 also includes receiving the signal through the resonator and a pressure sensor electrically coupled to the resonator, at 1004. For example, the network analyzer 904 may receive the signal through the crystal oscillator 902 and the pressure sensor 100.

The method 1000 further includes processing the signal to determine the pressure sensed by the pressure sensor, at 1006. For example, the network analyzer 904 of FIG. 9 may process the signal received through the crystal resonator 902 and the pressure sensor 100 to determine the pressure sensed by the pressure sensor 100. Processing the signal received through the crystal resonator and the pressure sensor may include determining one or more parameters of the signal, such as the voltage level, power, and/or frequency of the signal. The pressure sensed by the pressure sensor can be determined based on the frequency of the signal, which is indicative of the pressure sensed by the pressure sensor when the frequency of the signal matches the operating frequency of the crystal resonator, as described above with respect to FIG. 9. In some example embodiments, the pressure sensor may be the pressure sensor 100 of FIGS. 1 and 2.

At 1008, the method 1000 concludes with storing the information resulting from the processing. For example, the information may be stored in a memory, such as a static random access memory.

Although some embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A pressure sensor for sensing pressure of a fluid, the pressure sensor comprising:
   a tubular housing having a first capacitor plate segment and a second capacitor plate segment, the first capacitor plate segment and the second capacitor plate segment being on opposite sides of the tubular housing, wherein each of the first capacitor plate segment and the second capacitor plate segment includes a planar inner surface; and
   an anvil positioned within the tubular housing, wherein the anvil and the tubular housing function as opposite terminals of a variable capacitor, wherein a first capacitor plate side of the anvil and the first capacitor plate segment face each other and have a first gap therebetween, wherein a second capacitor plate side of the anvil and the second capacitor plate segment face each other and have a second gap therebetween, wherein the first capacitor plate segment and the second capacitor plate segment are deflectable in response to the pressure of the fluid, and wherein capacitance of the variable capacitor changes in response to a first change in a size of the first gap and a second change in a size of the second gap.

2. The pressure sensor of claim 1, further comprising an insulator attached to the anvil, wherein the insulator electrically isolates the anvil from the tubular housing and maintains the anvil in a fixed position within the tubular housing.

3. The pressure sensor of claim 1, further comprising:
   a sleeve surrounding a portion of the tubular housing; and
   a liquid compartment between the sleeve and the portion of the tubular housing, wherein the portion of the tubular housing includes the first capacitor plate segment of the tubular housing and the second capacitor plate segment of the tubular housing.

4. The pressure sensor of claim 3, further comprising a liquid in the liquid compartment.

5. The pressure sensor of claim 4, further comprising a fluid separator, wherein the liquid is isolated from the fluid by the fluid separator configured to transfer the pressure of the fluid to the liquid.

6. The pressure sensor of claim 5, further comprising one or more hollow tubes extending from the fluid separator to the liquid compartment.

7. The pressure sensor of claim 3, wherein the fluid separator is a bellows.

8. The pressure sensor of claim 1, wherein the tubular housing comprises:
   a first side segment extending between the first capacitor plate segment and the second capacitor plate segment and having a first curved inner surface that curves away from the anvil; and
   a second side segment extending between the first capacitor plate segment and the second capacitor plate segment and having a second curved inner surface that curves away from the anvil, wherein the first side segment and the second side segment are on opposite sides of the anvil.

9. The pressure sensor of claim 8, wherein each of the first side segment and the second side segment includes a first planar outer surface, a second substantially planar outer surface, and a third curved outer surface between the first planar outer surface and the second planar outer surface.

10. The pressure sensor of claim 1, wherein each of the first gap and the second gap includes air as a respective dielectric material.

11. A system for measuring a pressure of a fluid, the system comprising:
   a resonator having a first terminal and a second terminal;
   a signal source configured to provide a signal to the resonator via the first terminal of the resonator;
   a receiver configured to receive the signal from the resonator; and
   a pressure sensor electrically coupled to the second terminal of the resonator and to the receiver, wherein the receiver is configured to receive the signal via the pressure sensor, the pressure sensor comprising:
      a tubular housing having a first capacitor plate segment and a second capacitor plate segment, the first capacitor plate segment and the second capacitor plate segment being on opposite sides of the tubular housing, wherein each of the first capacitor plate segment and the second capacitor plate segment includes a planar inner surface; and
      an anvil positioned within the tubular housing, wherein the anvil and the tubular housing function as opposite terminals of a variable capacitor, wherein a first capacitor plate side of the anvil and the first capacitor plate segment face each other and have a first gap therebetween, wherein a second capacitor plate side of the anvil and the second capacitor plate segment face each other and have a second gap therebetween, wherein the first capacitor plate segment and the second capacitor plate segment are deflectable in response to the pressure of the fluid, and wherein capacitance of the variable capacitor changes in response to a first change in a size of the first gap and a second change in a size of the second gap.

12. The system of claim 11, wherein the pressure sensor further comprises:
   a sleeve surrounding a portion of the tubular housing; and
   a liquid compartment between the sleeve and the portion of the tubular housing, wherein the portion of the tubular housing includes the first capacitor plate segment of the tubular housing and the second capacitor plate segment of the tubular housing.

13. The system of claim 11, wherein the anvil of the pressure sensor and the second terminal of the resonator are coupled by a first electrical connector and wherein the tubular housing of the pressure sensor and the receiver are coupled by a second electrical connector.

14. The system of claim 11, wherein the resonator is a crystal resonator and wherein the signal source is configured to vary a frequency of the signal.

15. A method for measuring a pressure of a fluid, the method comprising:
   providing a signal to a resonator;
   receiving the signal through the resonator and a pressure sensor electrically coupled to the resonator;
   processing the signal to determine the pressure sensed by the pressure sensor, wherein the pressure sensor comprises:
      a tubular housing having a first capacitor plate segment and a second capacitor plate segment, the first capacitor plate segment and the second capacitor plate segment being on opposite sides of the tubular housing, wherein each of the first capacitor plate segment and the second capacitor plate segment includes a planar inner surface; and an anvil positioned within the tubular housing, wherein the anvil and the tubular housing function as opposite terminals of a variable capacitor, wherein a first capacitor plate side of the anvil and the first capacitor plate segment face each other and have a first gap therebetween, wherein a second capacitor plate side of the anvil and the second capacitor plate segment face each other and have a second gap therebetween, wherein the first capacitor plate segment and the second capacitor plate segment are deflectable in response to the pressure of the fluid, and wherein capacitance of the variable capacitor changes in response to a first change in a size of the first gap and a second change in a size of the second gap.

16. The method of claim 15, wherein the pressure sensor further comprises:
 a sleeve surrounding a portion of the tubular housing; and
 a liquid compartment between the sleeve and the portion of the tubular housing, wherein the portion of the tubular housing includes the first capacitor plate segment of the tubular housing and the second capacitor plate segment of the tubular housing.

17. The method of claim 15, further comprising varying a frequency of the signal provided to the resonator.

18. The method of claim 17, wherein the resonator is a crystal resonator and wherein processing the signal includes determining a voltage level of the signal.

* * * * *